United States Patent
Ferryman et al.

(10) Patent No.: US 9,068,655 B2
(45) Date of Patent: Jun. 30, 2015

(54) QUICK CHANGE BRUSH SEAL RETAINING ARRANGEMENT

(75) Inventors: Roger Ferryman, Moseley, VA (US); Patrick Fitzgerald, Richmond, VA (US); David Chrisman, Sandston, VA (US); Pavan Kumar Ravulaparthy, Glen Allen, VA (US)

(73) Assignee: Sealeze, A Unit of Jason Inc., Richmond, VA (US)

( * ) Notice: Subject to any disclaimer, the term of this patent is extended or adjusted under 35 U.S.C. 154(b) by 144 days.

(21) Appl. No.: 13/823,859

(22) PCT Filed: Jun. 6, 2012

(86) PCT No.: PCT/US2012/041081
§ 371 (c)(1),
(2), (4) Date: Mar. 15, 2013

(87) PCT Pub. No.: WO2012/170514
PCT Pub. Date: Dec. 13, 2012

(65) Prior Publication Data
US 2013/0175761 A1  Jul. 11, 2013

Related U.S. Application Data

(60) Provisional application No. 61/494,406, filed on Jun. 7, 2011.

(51) Int. Cl.
*F16J 15/32* (2006.01)
*F16J 15/16* (2006.01)

(52) U.S. Cl.
CPC ............... *F16J 15/16* (2013.01); *Y10T 74/219* (2015.01); *F16J 15/3288* (2013.01)

(58) Field of Classification Search
CPC ..................... F16J 15/3284; F16J 15/3288
USPC .................................................. 277/355
See application file for complete search history.

(56) References Cited

U.S. PATENT DOCUMENTS

| 8,505,923 B2 * | 8/2013 | Ferryman et al. | 277/355 |
| 2008/0309017 A1 * | 12/2008 | Mattice | 277/355 |
| 2011/0049810 A1 * | 3/2011 | Ferryman et al. | 277/355 |
| 2011/0200432 A1 * | 8/2011 | Alamsetty et al. | 415/230 |
| 2013/0277918 A1 * | 10/2013 | Fitzgerald et al. | 277/355 |

FOREIGN PATENT DOCUMENTS

| JP | 2005-061035 | 3/2005 |
| JP | 2010-521230 | 6/2010 |
| WO | 9906673 | 2/1999 |
| WO | 2010-063269 | 6/2010 |

\* cited by examiner

*Primary Examiner* — Gilbert Lee
(74) *Attorney, Agent, or Firm* — Boyle Fredrickson S.C.

(57) ABSTRACT

A quick change brush holder of a brush seal having a plurality of spaced apart deflectable brush retaining arrangements that include a tab that is bent into a brush receiving channel toward a brush engaging or retaining position to releasably retain a brush in the channel and that is bent away from the brush engaging or retaining position when it is desired to remove the brush or install a brush in the holder. Each tab has a brush abutment edge that abuts or stops a shoulder of a tape or spine of a brush in the channel preventing removal from the holder when disposed in a brush engaging or retaining position. The brush abutting edge extends generally parallel to the channel enabling a brush to be inserted transversely relative to a lengthwise extent of the holder tape or spine first into the holder.

27 Claims, 6 Drawing Sheets

QUICK CHANGE BRUSH SEAL RETAINING ARRANGEMENT

FIELD

The present invention is directed to a brush seal and more particularly to a retaining arrangement configured to facilitate removal and replacement of a brush of the brush seal.

BACKGROUND

Brush seals are used in many consumer, industrial, and commercial sealing applications to help provide a substantially air tight or gas tight seal, prevent air infiltration, as well as to provide a pressure drop resistant barrier. Such brush seals are typically part of a brush seal assembly that includes an elongate brush holder in which an elongate brush that provides the brush seal is received. The brush has a plurality of pairs of filaments folded over one another so their free ends form brush bristles with the folded filaments received in a tape or spine that holds the filaments in place. The brush holder typically is an elongate bracket having an elongate brush-receiving channel that holds the spine or tape of the brush and includes a mounting flange used to attach the entire brush seal assembly to something else, such as a piece of equipment, or the like.

Some sealing applications, particularly higher temperature sealing applications, adhere to relatively strict maintenance schedules that try and minimize equipment downtime. Many times there is a limited window of time to perform maintenance during scheduled downtime that can restrict the amount of actual maintenance that can be performed. Unfortunately, given the limited amount of time available, there are times when not all maintenance sought to be performed can be done.

In the past, changing brushes involved considerable time and effort. Where a brush could not be pulled out one end of the holder, the entire brush seal assembly would have to be removed by removing the brush holder. Even where one end of the brush holder is sufficiently unobstructed to allow a several foot long brush to be pulled in an axial or longitudinal direction out of a several foot long brush-receiving channel of the holder, it is neither simple nor quick to do so. The challenge is not just limited to brush removal, as the replacement brush needs to be inserted back into the brush receiving channel of the holder in a similar laborious manner. This also takes a considerable amount of time, can require great patience, and significant skill.

It is not unusual for these challenges to be compounded where brush replacement must be performed in a rather limited space. It can take considerable time to maneuver a brush being removed from the holder around walls and other obstacles which can require even more time to insert the replacement brush as more care must be taken to avoid damaging it during insertion.

What is needed is a holder constructed to enable faster brush changes.

SUMMARY

The present invention is directed to a quick change brush holder for a brush seal assembly that holds a brush of a brush seal that is removably mounted in a brush holder of quick change construction employing a plurality of spaced apart retaining arrangements that permit quick and easy brush removal and replacement. A preferred retaining arrangement includes a deflectable retainer tab that is deflectable between a brush engaging or retaining position that retains a brush in the holder and a brush removal position permitting removal of the brush. In a preferred embodiment, each retainer tab is deflected by being bent in a manner that plastically deforms at least a portion of the tab when deflect the tab between its brush engaging or retaining position and it brush removal position.

The brush is elongate and includes a plurality of pairs, i.e., at least three, of folded filaments that form brush bristles that extend outwardly from an elongate generally U-shaped tape or spine formed around the filament folds with the tape or spine having an end wall from which a pair of generally parallel sidewalls outwardly extend that each terminates in a shoulder or edge disposed alongside the bristles. The components of the brush can be made of temperature resistant materials such as where the brush is intended for high temperature brush sealing applications.

The brush holder has a mount carrying an elongate brush receiving channel in which the tape or spine of the brush is inserted during mounting of a brush in the holder. The brush receiving channel is generally U-shaped having a cross-sectional shape that is substantially complementary to that of the tape or spine of a brush received in the channel. The brush receiving channel is formed of a pair of spaced apart and generally parallel channel walls between which extends a shoulder that is a channel end wall against which an end wall of the tape or spine of a brush being inserted into the channel can abut.

One or both of the channel walls have one or more retainer tabs integrally formed therein that are bendable between (a) a brush engaging or retaining position where part of the tab extends into the channel and engages part of a brush when the brush is inserted into the channel and (b) a brush removal position where no engagement between the brush and any of the retainer tabs can occur. When bent toward the brush removal position, the tab is bent so it clears the channel so no part of the tab can obstruct or engage any portion of a brush being removed from the channel or inserted into the channel. When disposed in a brush removal position, each tab can be bent so it is substantially coplanar with the channel wall in which it is formed so that it is substantially flush with the channel wall. If desired, one or more of the tabs can even be bent farther outwardly beyond such a coplanar position where part of the tab can extend outwardly of the channel wall. When disposed in a brush removal position, brush insertion or brush removal can be and preferably is performed.

When bent toward a brush engaging position, each retainer tab has a brush abutment edge that abuts against an adjacent part of a shoulder of the tape or spine of the brush inserted into the brush receiving channel of the holder preventing withdrawal of the brush from the channel in a direction transverse to a lengthwise extend of the channel. When disposed in abutment with the shoulder of a tape or spine of a brush received in the channel, each tab releasably retains or locks the brush in the channel capturing the tape or spine of the brush between one or more of the retainer tabs and the shoulder or end wall of the channel.

When bent into a brush engaging or brush retaining position, the brush abutment edge of each retainer tab faces toward the shoulder or end wall of the channel defining a clearance recess in which the tape or spine of the brush seats and is captured when the brush is fully inserted into the channel. A preferred retainer tab is generally rectangular or trapezoidal having a tab tongue defined by an elongate brush abutment edge and a pair of side edges between which extends a fold line generally parallel to the brush abutment edge and the shoulder or end wall of the channel about which the tab is bent. Such a retainer tab can include an inclined portion extending into the channel when the tab is disposed in a brush engaging or retaining position defining a guide surface against which part of the tape or spine cams or slidably contacts during brush insertion helping to guide the tape or spine of the brush into place. Another preferred embodiment of a retainer tab includes an elongate finger that is bent along a fold line generally transverse to the shoulder or end wall of the channel and generally transverse to the brush abutment edge. Each retainer tab can and does preferably include a window that provides a tool access slot into which a tool is inserted to engage the tab to bend the tab into one or more desired positions.

During use and operation, a quick change brush holder in accordance with the present invention can be manipulated by an installer, maintenance worker, or the like, to disposed each one of its retainer tabs in a brush removal position thereby enabling removal of a brush mounted in the holder as well as enabling insertion of a brush into the brush receiving channel of the holder. In manipulating each one of the tabs, a tool, such as a pry tool like a screwdriver, can be manipulated to engage each tab to deflect the tab to bend it into a brush removal position. Where there is a tool access slot formed adjacent each tab, part of the tool is inserted into the slot of each tab to engage the brush abutment edge of each tab to bend the tab outwardly from the channel until no part of the brush abutment edge is disposed in the channel.

After any brush has been removed from the holder, each tab of the holder can be bent inwardly toward a brush engaging or brush retaining position where at least a part of the brush abutment edge of each tab is disposed in the brush receiving channel of the holder. A tool that can be different, such as a crimping tool or pliers, can be used to bend each tab inwardly into the channel into a brush engaging or retaining position.

Once all of the tabs are bent into a brush engaging or retaining position, a brush, such as a replacement brush, is inserted into the channel with the tape or spine of the brush being inserted "head first" into the channel in a direction generally transverse to a lengthwise or longitudinal extend of the channel. As the spine or tape is inserted, part of the spine or tape adjacent its shoulder cams or rides along a guide surface of each tab until the shoulder of the tape or spine clears the brush abutment edge of each tab snapping the brush into place. When snapped into place, the tape or spine of the brush is releasably captured by engagement between the brush abutment edge of each tab and the shoulder or end wall of the channel. When fully inserted into the channel, an interference fit provided between the abutment edge of each tab and the tape or spine shoulder prevents the brush from being removed from the channel in a direction generally transverse to the longitudinal or lengthwise extent of the elongate brush holder.

In another method of brush insertion, the brush can be inserted into the brush receiving channel of the brush holder before each tab is bent into a brush engaging or brush retaining position using a tool. In doing so, the brush is inserted spine or tape first, i.e., "head first," into the channel until the end wall of the tape or spine abuts the shoulder or end wall of the channel. Thereafter, each tab is manually bent into the channel toward a brush engaging or retaining position causing at least part of each tab to engage an adjacent part of the brush. In a preferred implementation of this method, each tab is bent into the channel after the brush has been inserted causing the brush abutment edge of each tab to be in line with and provide an interference fit with an adjacent portion of the shoulder of the tape or spine of the brush received in the channel releasably locking the brush in the holder.

Such a quick change holder advantageously enables a brush to be removed from and inserted into the brush receiving channel of the holder in a direction generally transverse to the longitudinal or lengthwise extent of the channel. This not only eliminates the need to have to pull a brush mounted in a holder in a direction generally parallel to the longitudinal or lengthwise extent of the brush receiving channel of the holder thereby advantageously enabling a brush seal assembly to be used in tight or cramped quarters, it also expedites and eases removal and insertion, does so more securely, and does so while better maintaining the integrity of a brush being installed.

These and various other features, aspects, and advantages of the present invention will be made apparent from the following descriptions of the drawings and detailed description.

BRIEF DESCRIPTION OF THE DRAWINGS

One or more preferred exemplary embodiments of the invention are illustrated in the accompanying drawings in which like reference numerals represent like parts throughout and in which.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figures 1, 2:
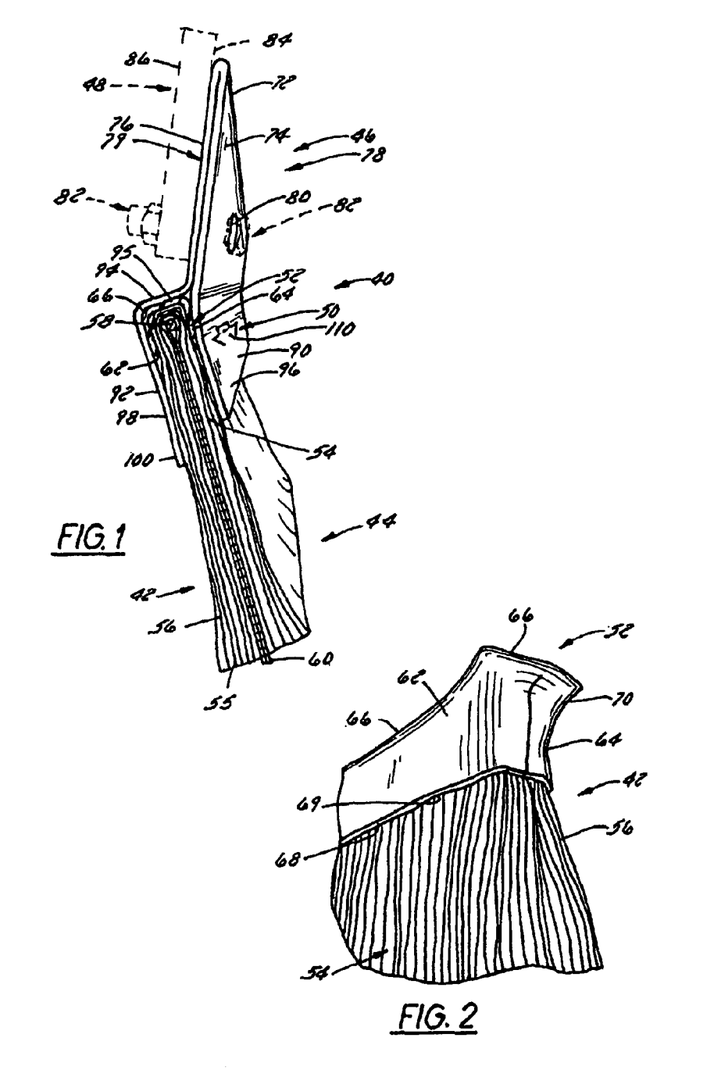
FIG. 1 is a perspective view of a brush received in a brush holder constructed in accordance with the new invention having a retaining arrangement that releasably engages a brush seal releasably securing the brush in the holder.
FIG. 2 is a fragmentary perspective view of part of the brush of FIG. 1 removed from the holder.

FIG. 1 illustrates a brush seal assembly 40 that includes a brush 42 that is a brush seal 44 received in a brush holder 46 constructed in accordance with the present invention that is attached to a piece of equipment 48 (shown in phantom) in which the brush 42 is used to provide a seal during operation. The brush holder 46 is configured not only to facilitate mounting of the brush seal assembly 40 to the piece of equipment 48, but is also configured with a brush retaining arrangement 50 constructed in accordance with the present invention that enables quick changing of the brush 42 in a manner that advantageously minimizes downtime.

With additional reference to FIG. 2, the brush 42 is elongate having an elongate longitudinally extending tape or spine 52 wrapped around or crimped around filaments 54 folded over one another that extend transversely outwardly from the tape or spine 52 defining brush bristles 56. The filaments 54 can be folded or crimped around an elongate longitudinally extending core wire 58 interiorly disposed within the tape or spine 52. The filaments 54 can be folded or crimped together with a membrane 60 that can be of imperforate construction that is embedded within the brush bristles 56, such as the membrane 60 depicted in FIG. 1.

The tape or spine 52 of the brush 42 is elongate extending substantially the length of the brush 42 having a pair of spaced apart and generally parallel sidewalls 62 and 64 that extend outwardly from an end wall 66 that can be flat or generally U-shaped. The tape or spine 52 is substantially rigid and formed around the filaments 54, such as by crimping or the like, with its substantially rigid sidewalls 62 and 64 respectively extending alongside filaments 54 on either side of the brush 42 providing lateral support to the filaments 54 while also helping to securely clamp the filaments 54 in place. The portion of the filaments 54 that extend outwardly beyond a shoulder 68 or bottom edge 69 of each tape or spine sidewall 62 and 64 defines brush bristles 56 that are flexible enabling the tips or ends 55 of the bristles 56 to brush up against or otherwise contact a surface of the equipment 48 that is moving relative to the brush 42 to provide a seal therebetween. While the tape or spine 52 can be open at one or both longitudinal ends of the brush 42, one or both ends can be crimped such as the end 70 of the tape or spine 52 shown in FIG. 2 formed by crimping both sidewalls 62 and 64 together.

Where the brush 42 is intended to be used in high temperature sealing applications where temperatures greater than 400° Fahrenheit are encountered, at least the filaments 54 and membrane 60 are made of a temperature resistant material with the tape or spine 52 and core wire 58 preferably also being made of temperature resistant material. Examples of suitable temperature resistant materials from which one or more of the aforementioned brush components can be made include stainless steel, titanium, aluminum, steel, or an alloy thereof, e.g., Cor-Ten, Haynes, e.g., Haynes 25, or Inconel, e.g., Incoloy 800, Inconel 625 or Inconel 718. Such a brush 42 can be used with a holder 46 constructed in accordance with the invention in high temperature equipment, e.g., equipment 48, including turbines, e.g., steam or gas turbines, or heat exchangers, such as air preheaters and regenerative air heat exchangers, that operate at temperatures ranging from 400° Fahrenheit to as high as 1,200° Fahrenheit.

Figure 3:
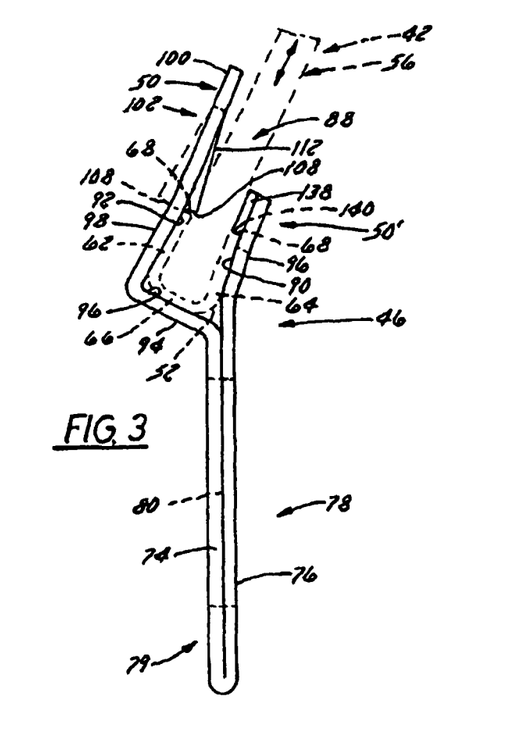
FIG. 3 is a right elevation view of the brush holder of FIG. 1.

With additional reference to FIGS. 2 and 3, the brush holder 46 is substantially rigid and can be formed of a single sheet 72 of a suitable material, e.g., metal, with one part of the sheet 72 folded over another part defining a pair of overlapping plates 74 and 76 that form a mount 78, such as a mounting flange 79, which is used to mount the brush holder 46 to a piece of equipment 48. The mounting flange 79 is elongate and generally planar as it preferably extends substantially the length of the brush seal 44 being provided. The flange 79 has a plurality of mounting holes 80, such as the generally transversely extending oblong elongate holes 80 shown in FIG. 4, which are longitudinally spaced apart along substantially the entire length of the holder 46. A fastener 82, such as depicted in phantom in FIG. 1, can extend through one or more of the mounting holes 80 to attach the mounting flange 79 to a part 84 of the equipment 48 in which the brush seal 44 is used. For example, where the piece of equipment 48 is a regenerative air preheater, the part 84 of the equipment 48 to which the mounting flange 79 of the holder 46 attaches can be a divider wall 86 of the regenerative air preheater. The part 84 of the equipment 48 to which the holder 46 attaches can also be a plate, a baffle, another flange, a wall, or the like.

The brush holder 46 also includes a brush receiving channel 88, such as shown in FIG. 3, in which the brush 42 is releasably mounted, such as in the manner depicted in FIG. 1. The brush receiving channel 88 is formed by a pair of generally parallel walls 90 and 92 that extend alongside a respective one of the sidewalls 62 and 64 of the tape or spine 52 of a brush 42 mounted to the holder 46. Channel walls 90 and 92 can and preferably do extend outwardly beyond the tape or spine sidewalls 62 and 64 of a brush 42 mounted in the holder 46 providing support to the brush bristles 56 when they flex during brush seal operation. A shoulder 94 that is a channel end wall 95 extends between the channel walls 90 and 92 against which the end wall 66 of the tape or spine 52 of a brush 42 abuts when the brush 42 is mounted in the holder 46.

In one preferred brush holder embodiment, the brush holder 46 is formed of a single sheet 72 of metal, such as steel, e.g., stainless steel, capable of withstanding high temperature environments ranging between 400° Fahrenheit and 1,200° Fahrenheit. The metal sheet 72 is formed to overlap plates 74 and 76 defining a mount 78 that preferably is an elongate perforated mounting flange 79 that extends substantially the length of a brush 42 releasably mounted in the holder 46. One of the plates 74 extends beyond the other one of the plates 76 terminating in a brush supporting skirt 96 that extends alongside bristles 56 of a brush 42 mounted in the holder 46 that also forms one of the brush receiving channel walls 90. The other one of the plates 76 is bent outwardly away from plate 74 forming the shoulder 94 against which the end wall 66 of the brush 42 abuts when received in the holder 46. The other plate 76 has an outwardly angled brush supporting skirt 98 that defines the other one of the channel walls 92 which extends outwardly beyond the outward extent of the other channel wall 90 to form a brush protecting deflector shield 100. Such a brush protecting deflector shield 100 advantageously protects a greater amount of bristles 56 of a brush 42 mounted in the holder 46 adjacent the shield 100 from high velocity particle impingement during brush seal operation which can advantageously extend brush life and maintain more optimal brush seal performance for a greater length of time.

At least one of the brush receiving channel walls 90 or 92 of the brush holder 46 includes at least one and preferably a plurality of brush retainers 50 spaced from the shoulder 94 to provide clearance space between each retainer 50 and shoulder 94 to releasably capture the tape or spine 52 of a brush 42 transversely inserted into the brush receiving channel 88 between each retainer 50 and the shoulder 94 against which the end wall 66 of the tape or spine 52 abuts. Each retainer 50 is movable between a brush engaging position that engages part of a brush 42 inserted into the channel 88 to releasably retain the brush 42 in the channel and a brush removal position where each retainer 50 disengages from the brush 42 permitting removal of the brush 42 from the holder 46. Since each retainer 50 can be repeatedly and relatively quickly moved between the brush engaging and brush removal positions, such a retainer equipped quick change brush holder 46 enables quick changing of brushes 42 without having to slide the brush 42 longitudinally out one end of the holder 46 and without having to remove the holder 46.

In a preferred quick change brush holder embodiment, at least one of the channel walls 90 and/or 92 has a plurality of pairs, i.e., at least three, brush retainers 50 spaced apart along the longitudinal extent of the brush holder 46. Each retainer 50 is spaced from the shoulder 94 of the channel 88 far enough outwardly from the shoulder 94 to allow each retainer 50 to engage part of the tape or spine 52 of a brush 42 while the end of the tape or spine 52 abuts the shoulder 94 when the retainer 50 is disposed in a brush engaging position where at least part of the retainer 50 extends inwardly into the channel 88. In a preferred embodiment, at least part of each retainer 50 is urged inwardly into the channel 88 when disposed in a brush engaging position that is a brush retaining position such that the retainer 50 engages a longitudinally extending outer or bottom edge 68 of the tape or spine 52 of a brush 42 transversely inserted into the channel 88 capturing the tape or spine 52 between each of the retainers 50 and the shoulder 94.

Figure 4:
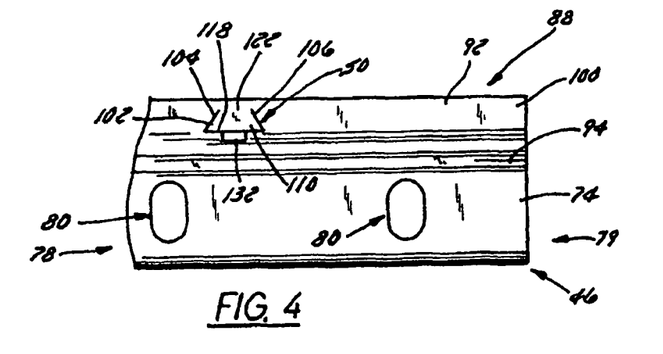
FIG. 4 is a fragmentary front elevation view of the brush holder of FIG. 1.

As is best shown in FIGS. 3 and 4, one preferred embodiment of a retainer 50 constructed in accordance with the present invention is a brush retainer tab 102 integrally formed of part of the holder 46 that is deflectable preferably by being bendable toward a brush engaging position, where the tab 102 has been bent inwardly into the brush receiving channel 88 as shown in FIG. 3 such that the tab 102 will engage a brush 46 (shown in phantom in FIG. 3) being inserted transversely into the channel 88. The tab 102 preferably is plastically deformed when bent toward such a brush engaging position like that shown in FIG. 3 so that at least part of the tab 102 remains disposed within the channel 88 to maintain engagement with a brush 42 inserted into the channel 88.

The tab 102 is deflectable preferably by being bendable away from the brush engaging position toward a brush removal position where no portion of the tab 102 is disposed within the channel 88 disengaging from the brush 42 enabling the brush 42 to be pulled transversely out of the channel 88 removing the brush 42 from the holder 46. The tab 102 preferably is plastically deformed when bent toward such a brush removal position so that the tab 102 is substantially flush or coplanar with the channel wall 92 of the holder 46 ensuring disengagement of the tab 102 from the brush 42. If desired, the tab 102 can be bent even farther outwardly away from the channel 88 so that part of the tab 102 extends outwardly beyond being flush or coplanar with the channel wall 92 such as when part of the tab 102 is bent outwardly of the channel wall 92 in the brush removal position like that depicted in phantom in FIG. 3.

Figure 5:
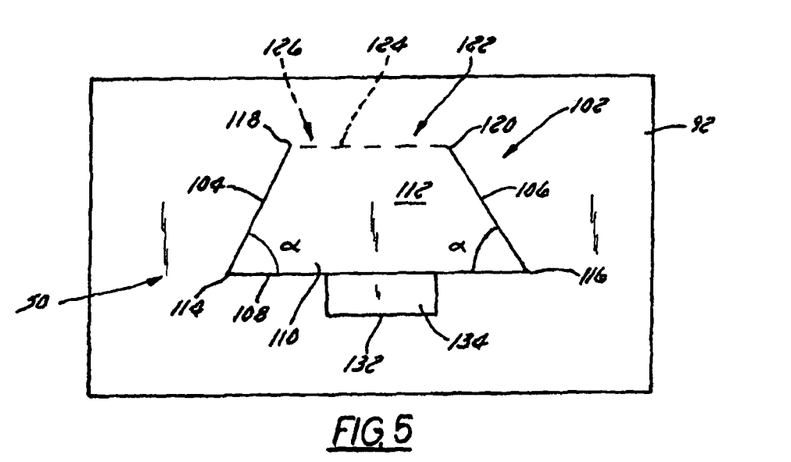
FIG. 5 is a fragmentary elevation view of one preferred embodiment of a tab retaining arrangement constructed in accordance with the present invention.

With reference to FIGS. 3-5, each brush retainer tab 102 has a pair of side edges 104 and 106 that extend generally transversely relative to the elongate longitudinally extending brush receiving channel 88 and a brush shoulder abutment edge 108 that extends generally parallel to the bottom wall 95 of the channel 88 when the tab 102 is bent inwardly into the channel 88 in a brush engaging or brush retaining position. As is best shown in FIGS. 4 and 5, the tab edges 104, 106, and 108 define a tab tongue 110 having a generally planar guide surface 112 disposed in the channel 88 facing toward the brush 42 against which the tape or spine 52 of a brush 42 being inserted into the channel 88 cams or slides along until the adjacent shoulder 68 of the tape or spine 52 clears the shoulder abutment edge 108 of the tab 102 snapping the brush 42 into place. When disposed in the brush engaging or brush retaining position, the shoulder abutment edge 108 faces toward the shoulder 94 of end wall 95 of the channel 88 and the guide surface 112 faces toward the brush 42. As a result, each tab 102 disposed in the brush engaging or brush retaining position provides snap fit engagement with an abutting portion of the tape or spine shoulder 68 when the end wall 66 of the tape or spine 52 abuts against the end wall 95 or shoulder 94 of the channel 88 during brush insertion retaining the brush 42 in the channel 88.

When the brush 42 has been snapped into the channel 88, the shoulder abutment edge 108 of each tab 102 disposed in the brush engaging or brush retaining position provides an interference fit with the tape or spine 52 of the brush 42 inserted into the channel 88 capturing the tape or spine 52 between the shoulder 94 of end wall 95 of the channel 88 and the shoulder abutment edge 108 of each tab 102. As is best shown in FIG. 3, when a brush 42 has been inserted into the channel 88, the shoulder abutment edge 108 of each tab 102 abuts an adjacent portion of the tape or spine shoulder 68 capturing the tape or spine 52 between each tab 102 and the shoulder 94 or end wall of the channel 88. Such positive engagement between each tab 102 and the brush 42 releasably yet securely retains the brush 42 in the holder 46 preventing removal of the brush 42 until the tabs 102 have been bent to a brush removal position.

With continued reference to FIG. 5, the tab 102 is integrally formed of part of one of the channel walls 92 having a shoulder abutment edge 108 that preferably is elongate to increase the surface area of contact between an abutting spine or tape shoulder 68 and the abutment edge 108 when a brush 42 has been fully inserted into channel 88. The tab 102 is of trapezoidal construction having a pair of side edges 104 and 106 obliquely angled at an acute angle, a, relative to the shoulder abutment edge 108 such that the side edges 104 and 106 generally converge toward one another. Each side edge 104 and 104 converges with a respective part of the brush holder abutment edge 108 to form corresponding corners 114 and 116 that are generally acutely angled and preferably generally equiangular. Opposite corners 114 and 116, the side edges 104 and 106 terminate at respective ends 118 and 120 between which a webbing 122 interconnecting the tongue 110 of the tab 102 with the rest of the channel wall 92. When the tab 102 is bent toward a brush engaging or brush retaining position, a fold line 124 generally parallel to the shoulder abutment edge 108 is produced that extends between the side edge ends 118 and 120 that defines a hinge 126 about which the tab 102 can be bent between a brush engaging or brush retaining position and a brush removal position.

Figure 6:
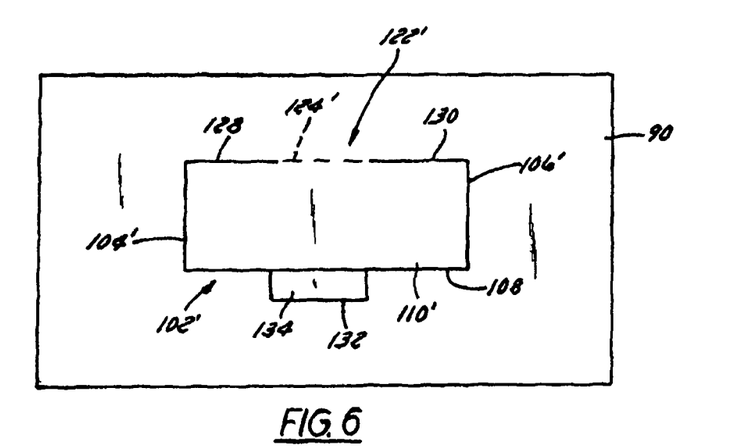
FIG. 6 is a fragmentary elevation view of another preferred embodiment of a tab retaining arrangement constructed in accordance with the present invention.

FIG. 6 illustrates another preferred embodiment of a brush retaining tab 102' that is generally rectangular having an elongate retainer tab tongue 110' extending toward the brush receiving channel shoulder 94 or end wall 95 that has a lengthwise extent generally parallel to the lengthwise direction of a brush 42 received in the brush receiving channel 88 of the brush holder 46. The tab 102' has an elongate brush abutment tab edge 108 that extends generally parallel to a spine or tape 52 of a brush 42 received in the channel 88 of a holder 46 equipped with a generally rectangular tab 102'. The tab 102' has a pair of spaced apart and generally parallel side edges 104' and 106' extending outwardly from the brush abutment tab edge 108. The tab 102' can have a pair of inturned edges 128 and 130 that extend from a respective one of the side edges 104' and 106' and converge toward one another helping to define a fold line 124' in the webbing 122' about which the tab 102' bends between the brush engaging position and the brush removal position.

Each brush retainer tab 102 and 102' can be integrally formed of one of the channel walls 90 and/or 92 in a conventionally known manner, such as by punching, cutting, or the like to integrally form the side edges 104 and 106 as well as the brush shoulder abutment edge 108 from the channel wall. A window 132 can be provided that defines a tool access slot 134 that extends along at least a portion of the brush abutment tab edge 108. Such a window 132 can be generally rectangular and elongate. Such a window 132 can be produced during stamping or another forming action, such as a cutting step, which completely removes part of the channel wall 90 or 92. Such a window 132 can provide clearance to help prevent interference between the brush holder abutment tab edge 108 and a portion of the brush channel wall 90 or 92 extending alongside the edge 108. In addition, such a window 132 allows a person inserting a brush 42 into the brush holder 46 or removing the brush 42 from the brush holder 46 to have visual feedback of the position of the tongue 110 of the tab 102 relative to the spine or tape 52 of the brush 42. As is discussed in more detail below, such a window 132 can also function as a tool access slot 134 into which a tool, such as a screwdriver, can be inserted to engaged and deflect the tab 102 to plastically deform and bend the tab 102 toward either its brush engaging position or its brush removal position.

Figure 7:
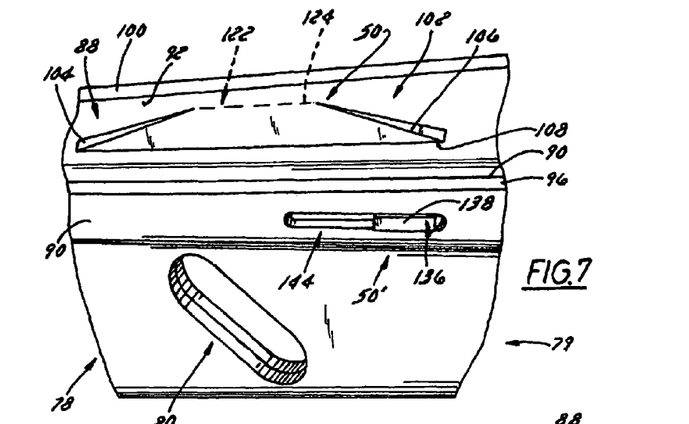
FIG. 7 is a fragmentary perspective view of a brush receiving channel of the brush holder depicting one tab retaining arrangement formed in one channel-defining sidewall and another tab retaining arrangement formed in the other channel-defining sidewall.
Figure 8:
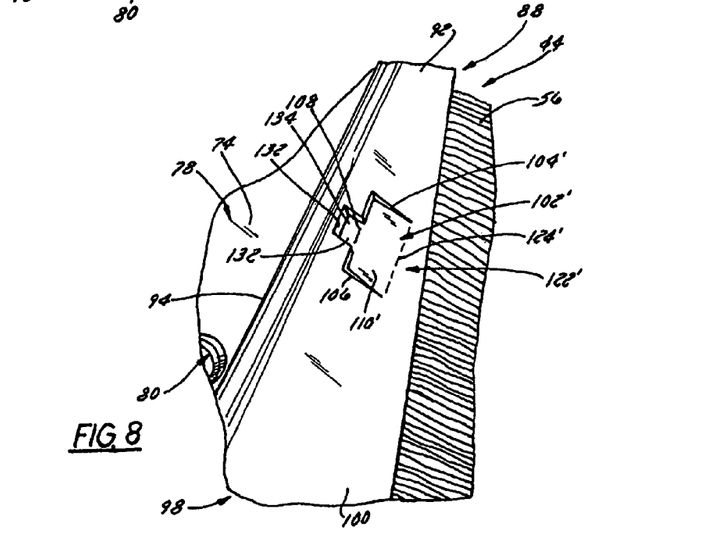
FIG. 8 is a perspective view of a brush received in the holder with one of the tab retaining arrangements disposed in a brush retaining position engaging the brush retaining the brush in the channel of the brush holder.

FIG. 7 illustrates a brush holder 46 with the brush retainer tab 102 disposed in an inwardly extending brush engaging position where the tab 102 has been bent so part of it is disposed in the brush receiving channel 88. FIG. 8 also shows the holder 46 with the tab 102 bent inwardly so at least the brush abutment tab edge 108 is disposed within the channel 88 of the holder 46 and in abutment with one of the shoulders 68 of the spine or tape 52 of a brush 42 received in the channel 88 releasably yet securely locking the brush 42 within the channel 88. Such a retainer tab arrangement that includes at least a plurality of pairs, i.e., last three longitudinally spaced apart tabs 102 not only locks the brush 42 in the holder 46 but also advantageously maintains a desired alignment or location of the brush 42 relative to the surface against which the tips 55 of the bristles 56 of the brush 42 seal during brush seal operation.

Figure 11:
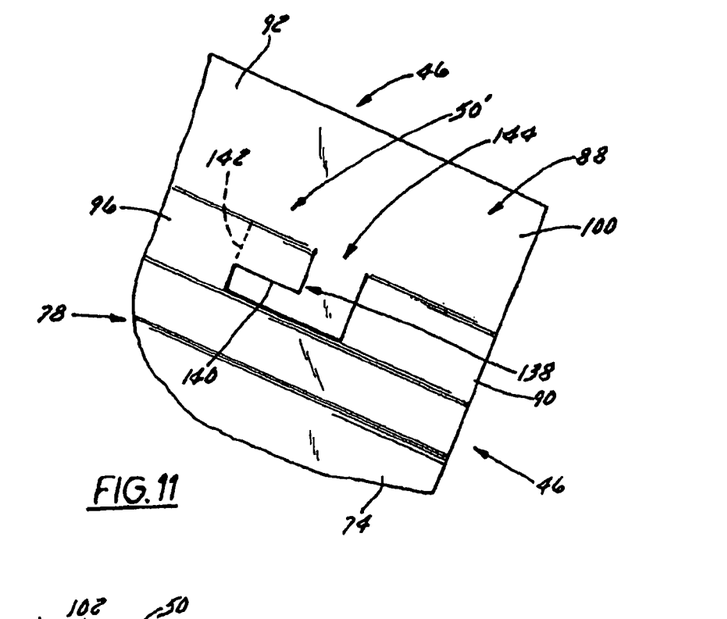
FIG. 11 is a fragmentary elevation view of the another preferred embodiment of a tab retaining arrangement constructed in accordance with the present invention.

FIGS. 3, 7 and 11 illustrate another preferred brush retainer arrangement 50' employing a brush retainer tab 136 that includes an elongate retainer finger 138 extending generally parallel to the shoulder 94 or end wall 95 of the brush holder channel 88 that is bent inwardly into the channel 88 such as shown in FIG. 3 to lock or help releasably retain a brush 42 received in the channel 88 and that is bent outwardly so the finger 138 clears the spine or tape 52 of a brush 42 received in the channel 88 enabling the brush 42 to be removed from the holder 46. The retainer finger 138 can be elongate and generally rectangular as most clearly depicted in FIG. 11 having a longitudinal extent generally parallel to the longitudinal extent of a brush 42 received in the channel 88 as well as to the shoulder 68 against which the spine or tape 52 abuts.

The retainer finger 138 has an elongate brush abutment edge 140 that extends generally parallel to part of the elongate shoulder 68 of the spine or tape 52 of a brush 42 received in the channel 88 of the holder 46. When bent or otherwise urged inwardly to a brush engaging or brush retaining position, the brush abutment edge 140 provides an interference fit by providing an abutment against which the shoulder 68 of the spine or tape 52 of a brush 42 received in the channel 88 of the holder 46 bears when the brush 42 is substantially completely inserted into the channel 88. A tool, such as a pliers or the like can be used to bend the finger 138 about a bend line or hinge 142 when bending the finger 138 into the channel 88 to releasably lock a brush 42 received in the channel 88 in place. A clearance slot 144 that enables insertion of a tool, such as the blade of a screwdriver, into the slot 144 when it is desired to bend the finger 138 to an out of the way position, such as where it is substantially co-planar with the channel wall 90 of which the finger 138 is integrally formed, enabling brush removal.

In use and operation, the tab 102 is disposed in a brush removal position allowing brush removal or brush insertion where its tongue 110 is substantially co-planar with the brush holder channel wall 90 or 92 from which the tab 102 is integrally formed such that it can therefore also be substantially co-planar with the corresponding skirt defined by the channel wall. When the tab 102 is substantially co-planar with channel wall 90 or 92, the brush 42 is inserted into the channel 88 by maneuvering the tape or spine 52 of the brush 42 transversely relative to the channel 88 until the tape or spine 52 enters the channel 88 moving toward the shoulder 94 or channel end wall 95. The tape or spine 52 is urged into the channel 88 until at least one of its shoulders 68 abuts against abutment edge 108 of tab 102.

Figure 9:
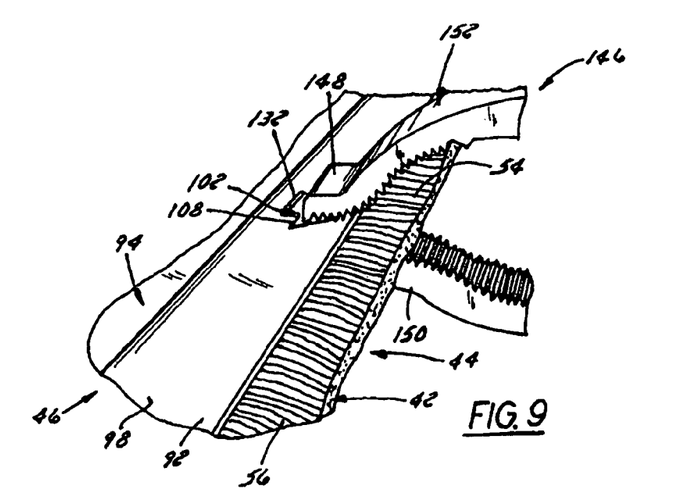
FIG. 9 is a perspective view of the brush and holder assembly of FIG. 8 depicting urging of the tab retaining arrangement into a brush retaining position.

With reference to FIG. 9, a tool 146, such as a pair of pliers, e.g., channel-lock pliers, or the like, are manipulated so the jaws 148 and 150 of the pliers 152 engage opposite sides of the channel walls 90 and 92 of the holder 46 with one jaw 148 overlying the tab 102 urging the tab 102 inwardly toward filaments 54 of the brush 40. Sufficient force is applied using the pliers 152 to bend the tab 102 in a manner that causes plastic deformation of at least part of the tab 102, preferably along the hinge portion 126 of the webbing 122, such that the tab 102 remains bent inwardly when the pliers 152 is removed. When the tab 102 is bent inwardly, the outer or bottom abutment edge 108 of the tab 102 underlies and abuts the shoulder 68 of the spine or tape 52 of the brush 42 releasably locking the brush 42 into the channel 88 of the holder 46.

Figure 10:
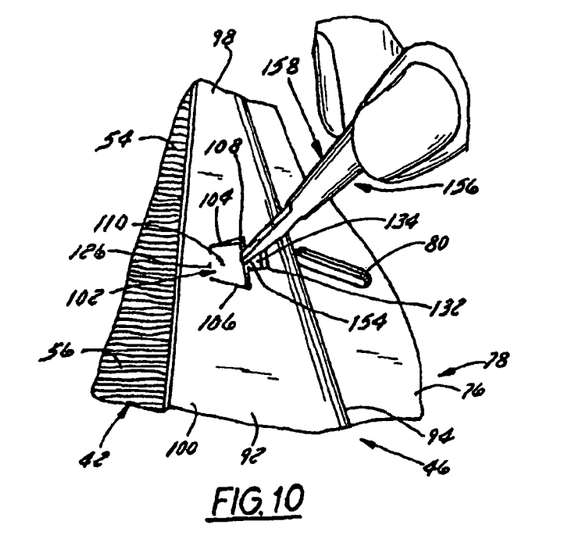
FIG. 10 is a perspective view of the brush and holder assembly of FIGS. 9 and 10 illustrating lifting of the tab retaining arrangement away from the brush enabling removal of the brush from the holder.

With reference to FIG. 10, when it is desired to remove the brush 42, such as during scheduled maintenance, a blade 154 of another tool 156, such as a screwdriver 158, is inserted into the tool access slot 134 of the window 132 so the blade 154 wedges between the tab 102 and part of the brush 42. A force is applied to pry the tab 102 away from the brush 42 until the abutment edge 108 of the tab 102 disengages from the shoulder 68 of the brush 42 allowing the brush 42 to be removed from the channel 88 of the holder 46. Enough force can be applied to the tab 102 to deflect the tab 102 sufficiently outwardly away from the channel 88 so the shoulder 68 of the spine or tape 52 of the brush 42 clears the tab 102 when a force is applied to the brush 42 pulling the brush 42 out of the channel 88 of the holder 46. If desired, enough force can be applied to bend the tab 102 away from the brush 42 so as to cause plastic deformation of the tab 102 in the region of the hinge 126.

The aforementioned steps in the two preceding paragraphs can be repeated as needed to quickly and securely insert a brush 42 into the holder 46 and to remove the brush 42 from the holder 46 producing a holder 46 that facilitates quick brush seal changing, such as to replace a brush 42 during a maintenance interval.

Figure 12:
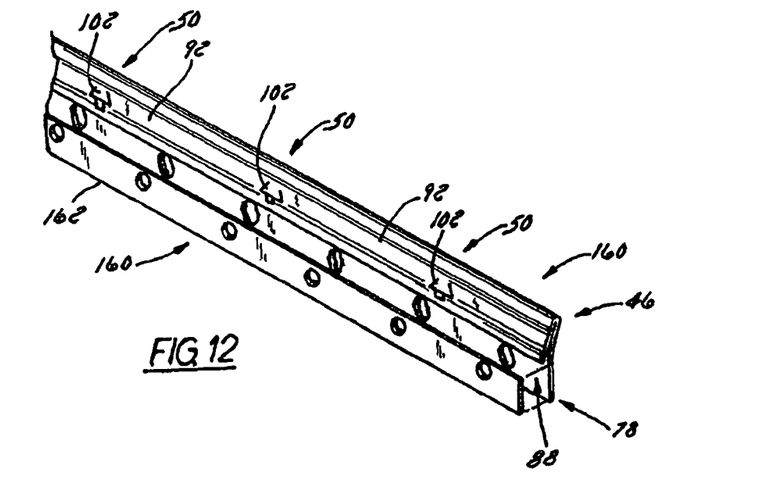
FIG. 12 is an exploded perspective view of a brush holder assembly comprised of a brush holder constructed in accordance with the present invention used in combination with a holder strip.

FIG. 12 illustrates another brush holder assembly 160 that includes a brush holder 46 with a plurality of pairs of spaced apart brush retaining arrangements 50 integrally formed in at least one of the channel-defining walls of the holder 46. If desired and in at least one preferred embodiment, there are brush retaining arrangements 50 and/or 50' integrally formed in both channel-defining walls of the holder 46 such that the brush retaining arrangements 50 and/or 50' can oppose one another such as by being directly opposite one another thereby cooperating with one another in releasably retain a brush 42 in the channel 88 of the holder 46. In a preferred embodiment, the brush retaining arrangements 50 and/or 50' can be spaced apart substantially the entire length of the holder 46. As is also shown in FIG. 12, a holder strip 162 can be part of the brush holder assembly 160 that is used to help mount the holder 46 to a piece of equipment, such as equipment 48.

During use and operation, a quick change brush holder 46 in accordance with the present invention can be manipulated by an installer, maintenance worker or the like, so each one of its retainer tabs 102 or 136 is disposed in a brush removal position thereby enabling removal of a brush 42 mounted in the holder 46 or enabling insertion of a brush 42 into the brush receiving channel 88 of the holder 46. In manipulating each one of the tabs 102 or 136, a tool 156, such as a pry tool like the screwdriver 158 shown in FIG. 10, can be manipulated to engage each tab 102 or 136 to deflect the tab to bend it into a brush removal position. Where there is a tool access slot 134 or 144 formed adjacent each tab 102 or 136, part of the tool such as a screwdriver blade 154 is inserted into the slot 134 or 144 to engage the brush abutment edge 108 or 140 of each tab 102 or 136 to bend the tab 102 or 136 outwardly from the channel 88 until no part of the brush abutment edge 108 or 140 is disposed in the channel 88.

After any brush 42 in the brush receiving channel 88 of the holder 46 has been removed, each tab 102 or 136 can be bent inwardly toward a brush engaging or brush retaining position where at least a part of the brush abutment edge 108 or 140 of each tab 102 or 136 is disposed in the channel 88 of the holder 46. A tool 146 that can be different, such as a crimping tool like the pliers 152 shown in FIG. 9, is used to bend each tab 102 or 136 inwardly into the channel 88 into a brush engaging or brush retaining position.

Once all of the tabs 102 of the holder 46 are bent into a brush engaging or brush retaining position, a brush 42, such as a replacement brush, is inserted into the channel 88 with the tape or spine 52 of the brush 42 being inserted "head first" into the channel 88 in a direction generally transverse to a lengthwise or longitudinal extent of the channel 88. As the spine or tape 52 of the brush 42 is inserted, part of the spine or tape 52 adjacent its shoulder 68 cams or rides along a guide surface 112 of the tab 102 until the shoulder 68 of the tape or spine 52 clears the brush abutment edge 108 of each tab 102 snapping the brush 42 into place in the holder 46. When snapped into place, the tape or spine 52 of the brush 42 is captured by engagement between the brush abutment edge 108 of each tab 102 and the shoulder 94 or end wall 95 of the channel 88 of the holder 46. When fully inserted into the channel 88, an interference fit provided between the abutment edge 108 of each tab 102 prevents the brush 42 from being removed from the channel 88 in an opposite direction generally transverse to the longitudinal or lengthwise extent of the elongate brush holder 46.

In another method of brush insertion, the brush 42 can be inserted into the brush receiving channel 88 of the brush holder 46 before each tab 102 or 136 is bent into a brush engaging or brush retaining position using a tool 146 such as is depicted in FIG. 9. In doing so, the brush 42 is inserted spine or tape first into the channel 88 until the end wall 66 of the tape or spine 52 abuts the shoulder 94 or end wall 95 of the channel 88. Thereafter, each tab 102 or 136 is manually bent into the channel 88 toward a brush engaging or brush retaining position where at least part of each tab 102 or 136 engages part of the brush 42. In a preferred implementation of this method, each tab 102 or 136 is bent into the channel 88 causing the brush abutment edge 108 or 140 of each tab 102 or 136 to be in line with and provide an interference fit with an adjacent portion of the shoulder 68 of the tape or spine 52 of a brush 42 received in the channel 88.

Such a quick change holder 46 advantageously enables a brush 42 to be removed from and inserted into the brush receiving channel 88 of the holder 46 in a direction generally transverse to the longitudinal or lengthwise extent of the channel 88 and holder 46. This not only eliminates the need to have to pull a brush mounted in a holder in a direction generally parallel to the longitudinal or lengthwise extent of the holder, enabling a brush seal assembly to be used in tight or cramped quarters, it facilitates quicker removal and insertion, does so more securely, and does so while better maintaining the integrity of a brush being installed.

Understandably, the present invention has been described above in terms of one or more preferred embodiments and methods. It is recognized that various alternatives and modifications may be made to these embodiments and methods which are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A brush holder for a brush seal comprising a brush receiving channel defined by a pair of channel sidewalls with at least one of the channel sidewalls comprising a retainer that releasably retains a brush received in the brush receiving channel when disposed in engagement with the brush and that allows removal of the brush from the brush receiving channel when disengaged from the brush, wherein the retainer is deflected between a brush engaging position that engages the brush releasably retaining the brush in the channel and a brush removal position clearing the channel releasing the brush enabling the brush to be removed from the channel, and wherein the deflectable retainer is deflected into the brush engaging position by being bent into the channel with at least part of the deflectable retainer remaining in the channel engaging a brush received in the channel releasably retaining the brush in the channel and wherein the deflectable retainer is deflected from the brush engaging position by being bent toward a brush removal position until the deflectable retainer clears the channel remaining clear of the channel disengaging from the brush enabling removal of the brush from the channel.

2. The brush holder of claim 1 wherein the brush received in the brush receiving channel comprises a plurality of pairs of filaments folded over one another so their free ends form brush bristles with the folded filaments received in a tape or spine that holds the filaments in place and the retainer bears against part of the tape or spine of the brush received in the brush receiving channel when the retainer is disposed in the brush engaging position.

3. The brush holder of claim 2 wherein the deflectable retainer engages an edge of the tape or spine of the brush received in the brush receiving channel when the deflectable retainer is disposed in the brush engaging position.

4. The brush holder of claim 3 wherein the deflectable retainer has an elongate brush abutment edge that extends generally parallel to the edge of the tape or spine of the brush received in the brush receiving channel when the deflectable retainer is disposed in the brush engaging position.

5. The brush holder of claim 1 wherein the deflectable retainer is plastically deformed when bent.

6. The brush holder of claim 1 wherein the deflectable retainer is integrally formed of part of one of the sidewalls that define the brush receiving channel.

7. The brush holder of claim 1 wherein the deflectable retainer is bent when deflected.

8. The brush holder of claim 1 wherein the deflectable retainer is deflected generally parallel to a longitudinal or lengthwise direction of the brush holder when deflected between the brush engaging position and the brush removal position.

9. The brush holder of claim 1 wherein the deflectable retainer is deflected generally transverse to a longitudinal or lengthwise direction of the brush holder when deflected between the brush engaging position and the brush removal position.

10. A brush holder for a brush seal comprising a brush receiving channel defined by a pair of channel sidewalls with at least one of the channel sidewalls comprising a retainer that releasably retains a brush received in the brush receiving channel when dispose in engagement with the brush and that allows removal of the brush from the brush receiving channel when disengaged from the brush, wherein the retainer is deflected to a brush engaging position that engages the brush releasably retaining the brush in the channel, and wherein the deflectable retainer comprises a stop that abuts against a tape or spine of a brush received in the channel when disposed in the brush engaging position.

11. The brush holder of claim 10 wherein the deflectable retainer stop comprises an edge of the deflectable retainer that abuts against an edge of the tape or spine of the brush received in the channel retaining the brush in the channel.

12. The brush holder of claim 11 wherein the deflectable retainer comprises a ramp extending into the channel when the deflectable retainer is disposed in the brush engaging position enabling the tape or spine of the brush being inserted into the channel to slidably contact the ramp until the edge of the tape or spine of the brush abuts the edge of the deflectable retainer stop.

13. The brush holder of claim 12 wherein engagement between the brush and the deflectable retainer when the brush is inserted into the channel comprises snap fit engagement.

14. The brush holder of claim 11 wherein the channel is defined by a shoulder between the channel sidewalls against which an end wall of the tape or spine of the brush abuts when the brush is received in the channel with the edge of the deflectable retainer stop abutting against the edge of the tape or spine of the brush received in the channel.

15. The brush holder of claim 10 wherein the deflectable retainer is deflected generally parallel to a longitudinal or lengthwise direction of the brush holder when deflected toward the brush engaging position.

16. The brush holder of claim 10 wherein the deflectable retainer is deflected generally transverse to a longitudinal or lengthwise direction of the brush holder when deflected toward the brush engaging position.

17. A brush holder for a brush seal comprising a brush receiving channel defined by a pair of channel sidewalls with at least one of the channel sidewalls comprising a retainer that releasably retains a brush received in the brush receiving channel when disposed in engagement with the brush and that allows removal of the brush from the brush receiving channel when disengaged from the brush, and wherein the retainer comprises a tab that is bent between a brush engaging position to releasably retain a brush received in the channel and a brush removal position allowing removal of the brush from the channel.

18. The brush holder of claim 17 wherein the tab has an edge generally parallel to a longitudinal direction or lengthwise extent of a spine or tape of a brush received in the channel that abuts an edge of the spine or tape of the brush when disposed in the brush engaging position releasably retaining the brush in the holder.

19. The brush holder of claim 18 wherein the tab is formed of part of one of the sidewalls that define the brush receiving channel.

20. The brush holder of claim 18 wherein the tab is bent about a bend line that is generally parallel to a longitudinal or lengthwise direction of the brush holder.

21. The brush holder of claim 18 wherein the tab is bent about a bend line that is generally transverse to a longitudinal or lengthwise direction of the brush holder.

22. The brush holder of claim 18 wherein the channel is defined by a shoulder extending between the channel sidewalls against which an end wall of the tape or spine of the brush abuts when the brush is received in the channel with the edge of the tab abutting against the edge of the tape or spine of the brush received in the channel.

23. The brush holder of claim 18 wherein engagement between the brush and the tab when the brush is inserted into the channel comprises snap fit engagement.

24. The brush holder of claim 17 further comprising a tool slot formed in the sidewall adjacent the tab enabling insertion of a tool to engage and bend the tab.

25. The brush holder of claim 17 wherein the tab is bent about a bend line that is generally parallel to a longitudinal or lengthwise direction of the brush holder when the tab is bent between the brush engaging position and the brush removal position.

26. The brush holder of claim 17 wherein the tab is bent about a bend line that is generally transverse to a longitudinal or lengthwise direction of the brush holder when the tab is bent between the brush engaging position and the brush removal position.

27. The brush holder of claim 17 wherein the tab is of trapezoidal construction having a pair of side edges obliquely angled relative to a brush abutment edge that engages the brush when the tab is disposed in the brush engaging position.

* * * * *